(12) United States Patent
Bussear (10) Patent No.: US 8,424,842 B2
(45) Date of Patent: Apr. 23, 2013

(54) ROTATIONALLY-ACTUATED FLAPPER VALVE AND METHOD

(75) Inventor: Terry R. Bussear, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 621 days.

(21) Appl. No.: 12/424,308

(22) Filed: Apr. 15, 2009

(65) Prior Publication Data

US 2010/0264346 A1  Oct. 21, 2010

(51) Int. Cl.
*F16K 31/44* (2006.01)
(52) U.S. Cl.
USPC ......... 251/252; 251/251; 251/250.5; 251/273
(58) Field of Classification Search .................. 251/298, 251/299, 300, 301, 248, 251, 252
See application file for complete search history.

(56) References Cited

U.S. PATENT DOCUMENTS

| | | | |
|---|---|---|---|
| 1,000,719 A | 8/1911 | Cram | |
| 1,926,759 A | 9/1933 | Wallman | |
| 2,162,578 A | 6/1939 | Hacker | |
| 2,447,842 A | 8/1948 | Cameron et al. | |
| 2,849,207 A * | 8/1958 | Conrad | 251/349 |
| 3,398,928 A * | 8/1968 | Fredd | 251/251 |
| 3,815,619 A * | 6/1974 | Ross et al. | 137/68.13 |
| 3,937,240 A | 2/1976 | Nanny | |
| 4,054,153 A | 10/1977 | Guyton | |
| 4,154,303 A | 5/1979 | Fournier | |
| 4,316,596 A * | 2/1982 | Krober et al. | 251/58 |
| 4,411,405 A * | 10/1983 | Barbe | 251/306 |
| 4,433,702 A | 2/1984 | Baker | |
| 4,457,376 A | 7/1984 | Carmody et al. | |
| 4,531,587 A | 7/1985 | Fineberg | |
| 5,044,396 A | 9/1991 | Daudet et al. | |
| 6,047,949 A * | 4/2000 | Beauchemin, Jr. | 251/257 |
| 6,227,299 B1 | 5/2001 | Dennistoun | |
| 6,877,564 B2 | 4/2005 | Layton et al. | |
| 2003/0079880 A1 | 5/2003 | Deaton et al. | |
| 2008/0210431 A1 | 9/2008 | Johnson et al. | |

OTHER PUBLICATIONS

Baker Hughes Incorporated, "SelecT Safety Valves", Best in Class, Baker Oil Tools, Pub. No. BOT-07-13602, May 2008, Houston, Texas, pp. 1-4.

* cited by examiner

*Primary Examiner* — Dinh Q Nguyen
(74) *Attorney, Agent, or Firm* — Cantor Colburn LLP (57) ABSTRACT

A rotationally actuated flapper valve including a flapper; a sinuous edge perimetrically about the flapper; and a congruous sinuous edge disposed at another component of the valve, the component being rotatable to misalign the congruous sinuous edge with the sinuous edge of the flapper whereby the flapper is urged out of a closed position and method.

17 Claims, 9 Drawing Sheets

ROTATIONALLY-ACTUATED FLAPPER VALVE AND METHOD

BACKGROUND

Valves such as fluid loss control valves, safety valves, shut-off valves, etc. are very well known in downhole industries and especially so in the hydrocarbon recovery industry. Commonly, valves including but not limited to safety valves comprise a flapper and a flow tube operably configured to work together in a housing. The flapper can be driven off its seat by extension of the flow tube through the flapper. Although traditional safety valve configurations are ubiquitous and function well for their intended purpose, there is significant expense involved in manufacture due to material volume, machining work, etc. Reduction in costs while retaining function of flapper based valves will be welcomed by the art.

SUMMARY

A rotationally actuated flapper valve including a flapper having a non planar interaction surface thereon; a congruous component of the valve, the interaction surface and the congruous component being selectively alignable and misalignable and when misaligned the flapper is at least partially open.

A rotationally actuated flapper valve including a flapper; a sinuous edge perimetrically about the flapper; and a congruous sinuous edge disposed at another component of the valve, the component being rotatable to misalign the congruous sinuous edge with the sinuous edge of the flapper whereby the flapper is urged out of a closed position.

A method for actuating a flapper of a valve includes rotating one component of the valve relative to another component of the valve, the rotating causing misaligning if aligned or aligning if misaligned a nonplanar surface on one of the flapper or another component of the valve; and encouraging the flapper to another position pursuant to the rotating.

BRIEF DESCRIPTION OF THE DRAWINGS

Referring now to the drawings wherein like elements are numbered alike in the several figures.

DETAILED DESCRIPTION

Figure 1:
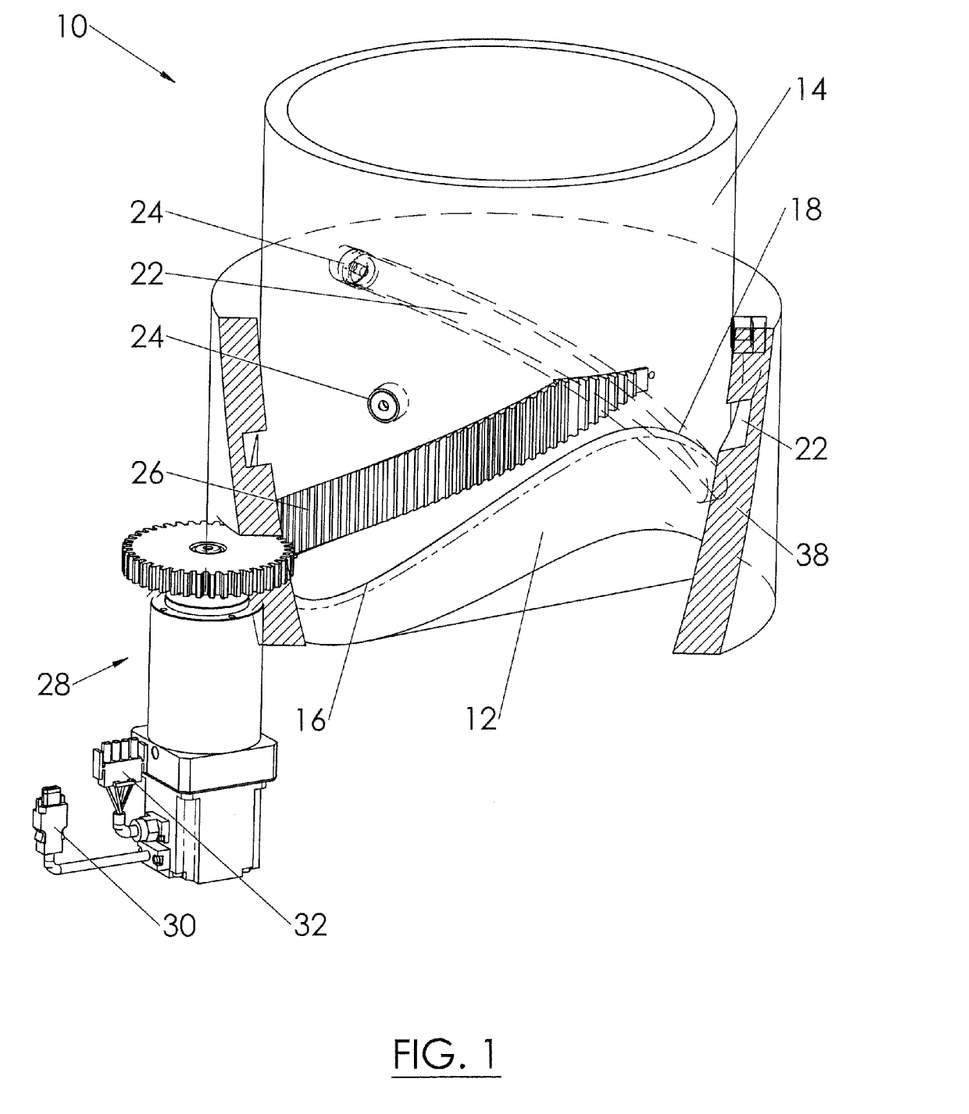
FIG. 1 is a partial cross sectional view of an embodiment of a rotationally-actuated flapper valve in a closed position.

Referring to FIG. 1, an embodiment of the rotationally actuated flapper valve 10 is illustrated in a fully closed position with a flapper 12 engaged with a flapper seat 14. Each of the flapper 12 and the seat 14 are embodied with a sinuous edge 16 and 18, respectively. These edges are perimetrical about the flapper and seat and are generally congruous shapes, and in one embodiment are complementary shapes. When the flapper and seat are aligned, the flapper may be closed against the seat and in some embodiments will seal there against. Rotation of the seat or the flapper will cause the flapper and seat to move apart hence opening the flapper 12 to a degree. The degree to which the flapper opens is dependent in part of the angle of the slopes of the sinuous edges 16 and 18. Angles approaching 45 degrees will permit the greatest flapper displacement and hence the greatest angular change relative to the seat 14. Maximum movement of the flapper due to contact between edges 16 and 18 is achieved when a highest point of the sinuous edge 16 on flapper 12 is aligned with the highest point of the sinuous edge 18 on the seat 14.

Misalignment of the flapper and the seat causes a lack of ability to seal and in fact can be used to cause the flapper to open, as is the intent in this embodiment. The high points of the sinuous edges 16 and 18 interfere with one another to cause a pivoting movement of the flapper 12 about a pivot 20 (see FIG. 4).

In the embodiment illustrated in FIGS. 1-4, the valve 10 is depicted in the closed, partially open and open positions to provide a clear understanding of the valve 10. In this embodiment the configuration relies upon the sinuous edge detail 16 and 18, a helical groove 22 and a groove follower 24, and a helical spur gear 26 driven by a suitable drive 28.

Figure 2:
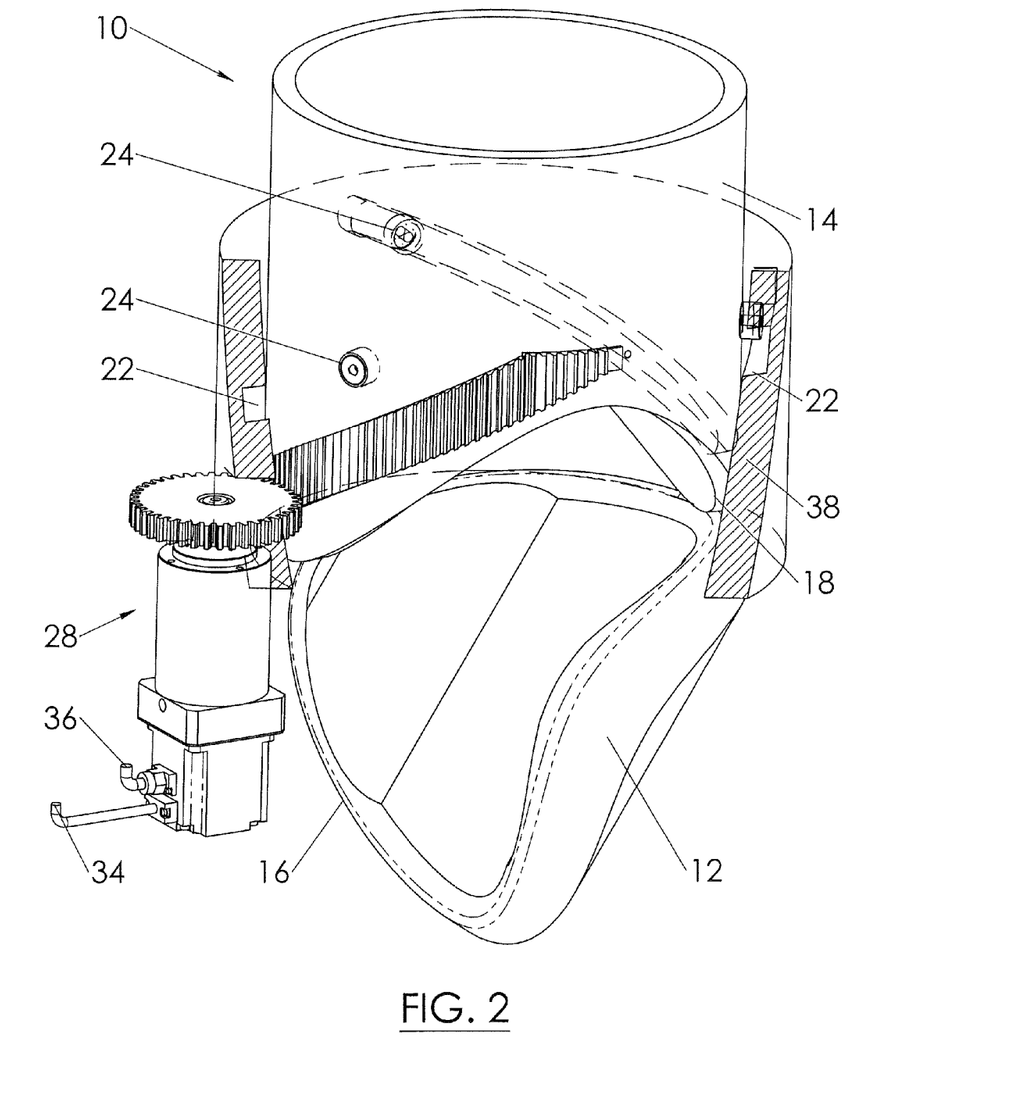
FIG. 2 is the valve of FIG. 1 illustrated in a partially open position.
Figure 3:
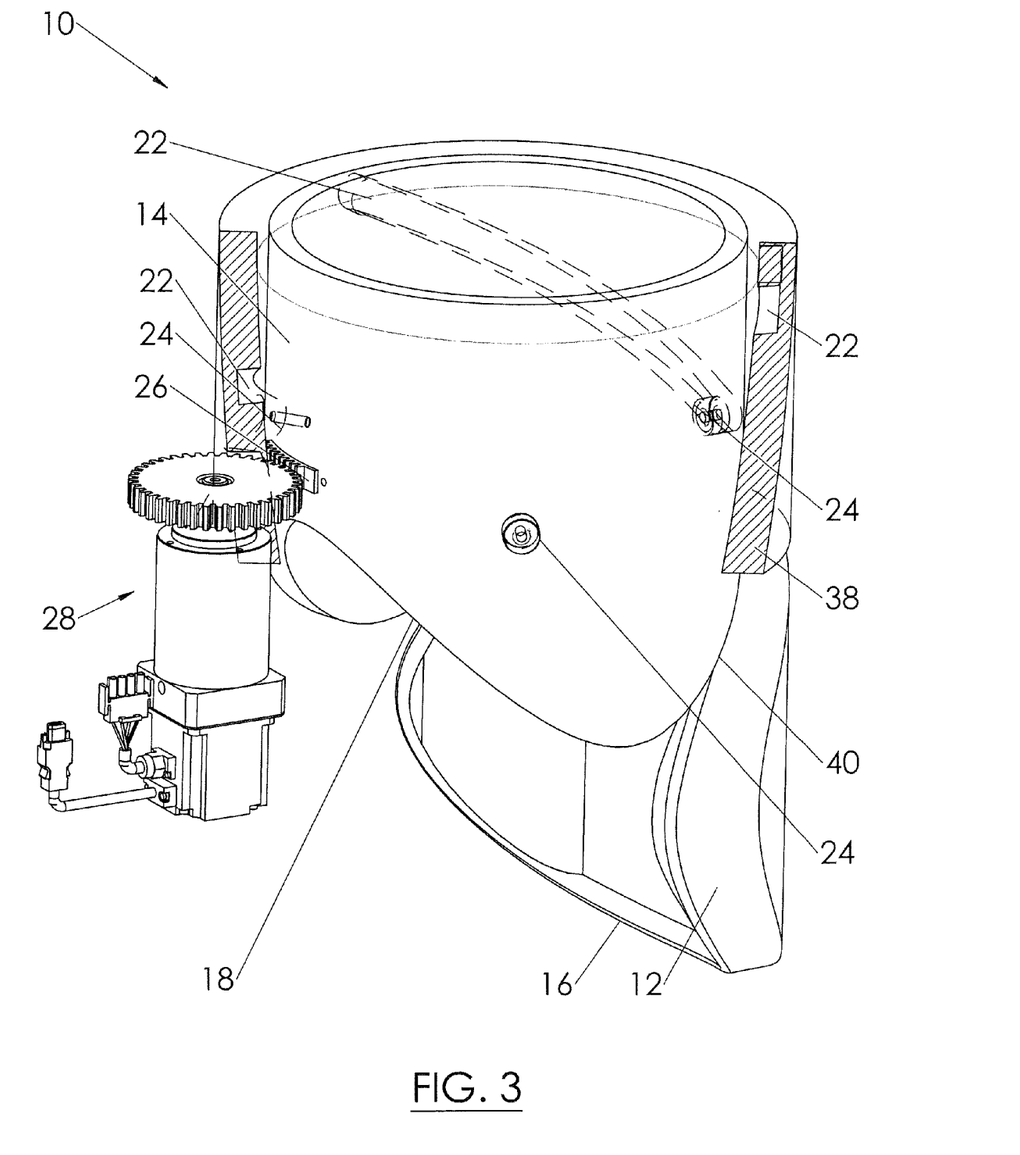
FIG. 3 is the valve of FIG. 1 in a fully open position.

Operation is best described sequentially referring to FIGS. 1-3. In FIG. 1, the flapper 12 is closed and the seat 14 is at a position relative to the housing and the flapper that allows the flapper to engage in a sealing relationship with the seat 14. Upon actuation of a drive 28, which may be an electric motor (illustrated with electrical connections 30 and 32 in FIG. 1), hydraulic motor (illustrated with hydraulic fluid inlet 34 and outlet 36 in FIG. 2), etc. that is in driving communication with the spur gear 26, the seat 14 rotates about its own axis thereby misaligning the sinuous edge 18 of the seat 14 with the sinuous edge 16 of the flapper 12. This causes the flapper 12 to be urged in an axial direction away from the seat 14. Because the flapper 12 is hingedly connected to a housing 38 within which the seat 14 rotates, the flapper will pivot about pivot 20 pursuant to the axial load thereon. The degree of pivot of the flapper 12 is, as noted above, related to the angle of the sinuous edges but it is often less than fully open due to limitations of possible slopes. Limitations may be related to geometry alone or may be related to frictional increases, as the slope gets steeper. In order to efficiently achieve a fully open condition as illustrated in FIG. 3, the seat 14 moves axially at the same time that it moves rotationally. This occurs pursuant to the follower 24 riding in helical groove 22 as the drive 28 forces the seat 14 to rotate. The spur gear 26 is helically configured in order to stay engaged with the drive 28 as the seat 14 changes position axially. Because the seat 14 moves in the direction of the flapper, the contact point 40 between the seat 14 and the flapper 12 continues to urge the flapper 12 until it is fully open as shown in FIG. 3.

Figure 4:
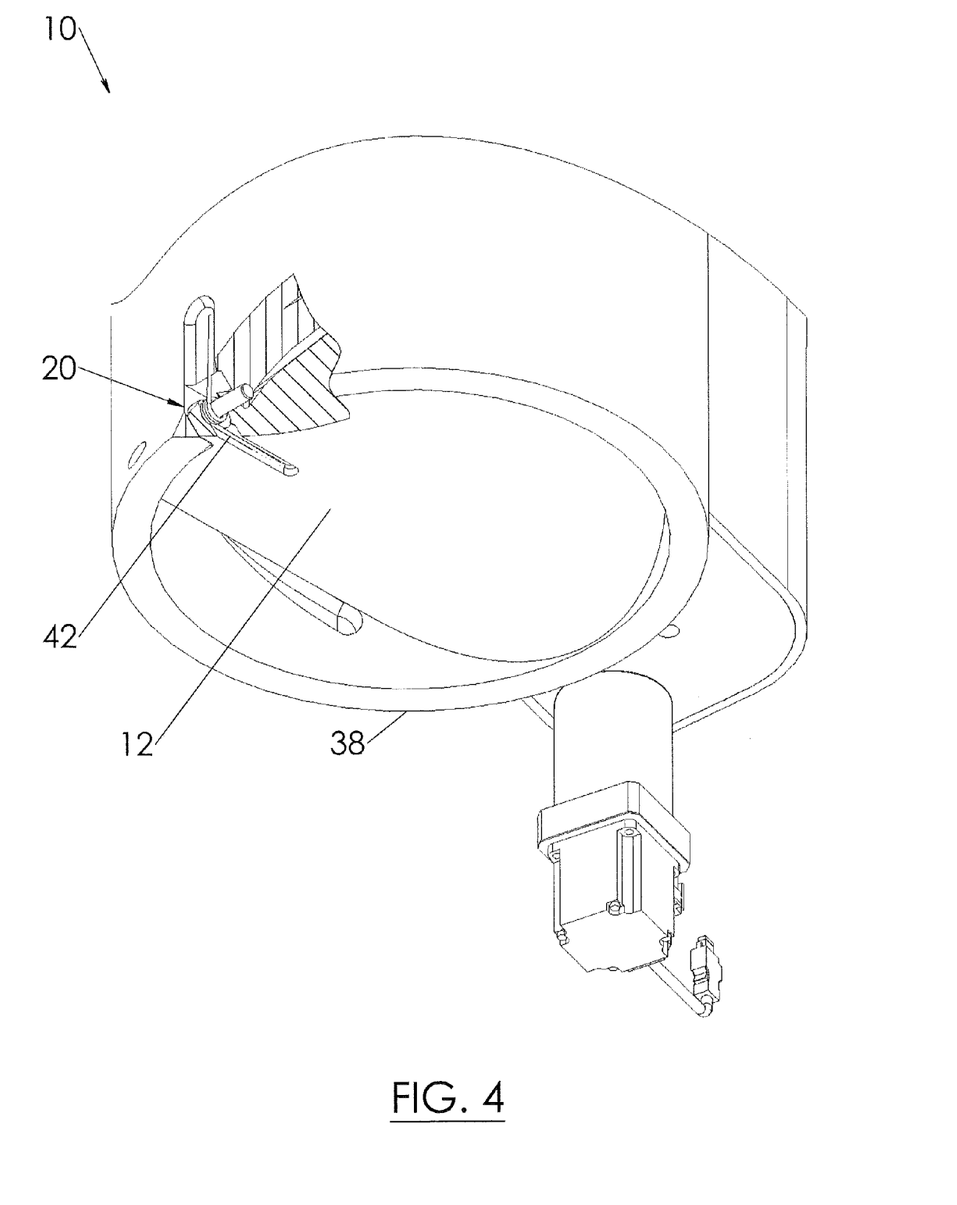
FIG. 4 is a perspective view of the valve that illustrated a valve pivot.

The flapper is closed in this embodiment by a return spring 42, visible in FIG. 4.

Figures 5, 6:
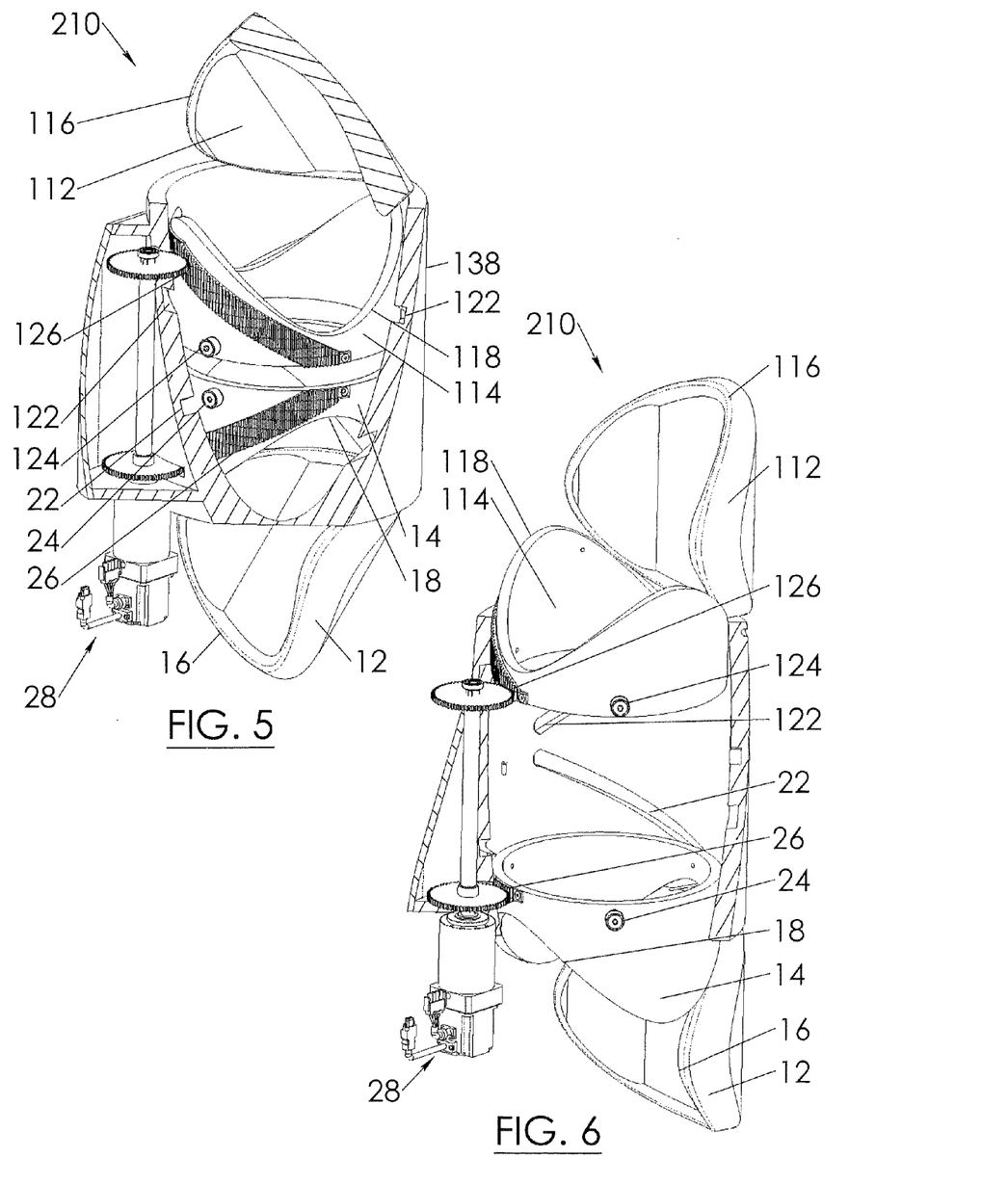
FIG. 5 is an alternate embodiment of a rotationally-actuated flapper valve in a partially open position.
FIG. 6 is the valve of FIG. 5 in a fully open position.

Referring now to FIGS. 5 and 6, an alternate embodiment that rotationally actuates two opposed flapper valves simultaneously is illustrated. It will be apparent to one having read the foregoing that this embodiment includes a mirror image of the components in the first discussed embodiment. A single drive 28 actuates both of the mirrored configurations and they operate identically to each other but in opposite directions. For clarity each of the components in the mirrored section are endowed with a 100 series equivalent of the numerals used in the first described embodiment.

Figure 7:
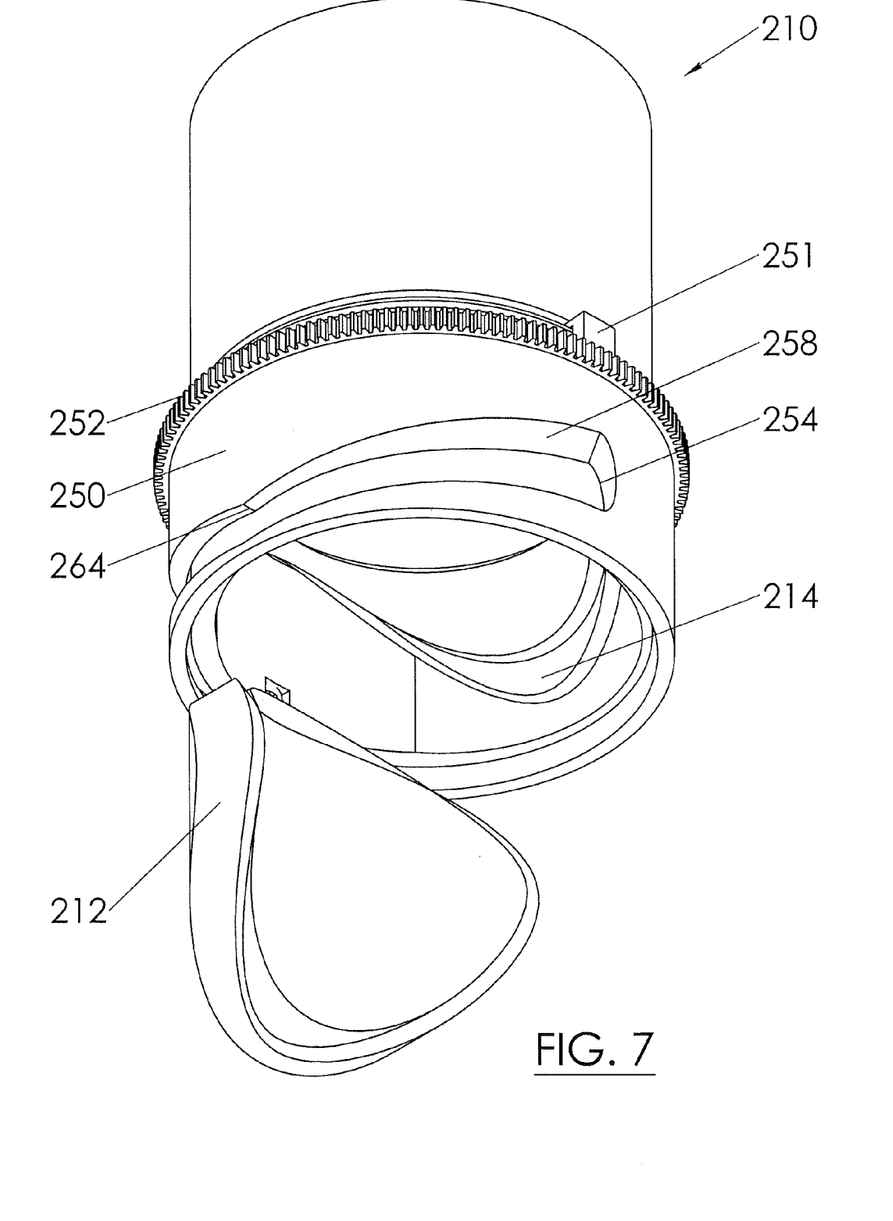
FIG. 7 is a perspective view of another alternate embodiment of a rotationally actuated flapper in a fully open position.
Figure 8:
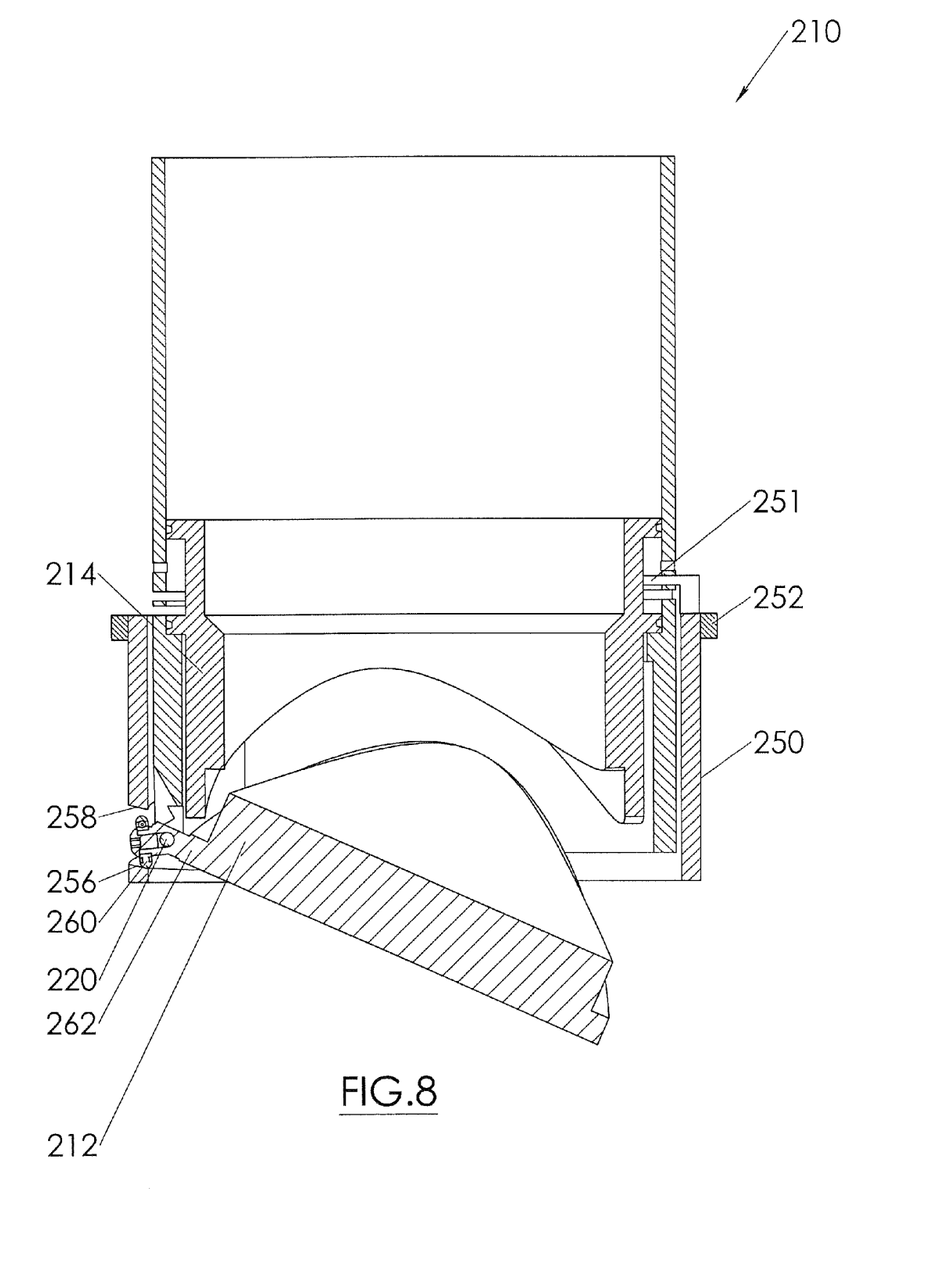
FIG. 8 is a cross sectional view of the valve of FIG. 7 in a partially open position.
Figure 9:
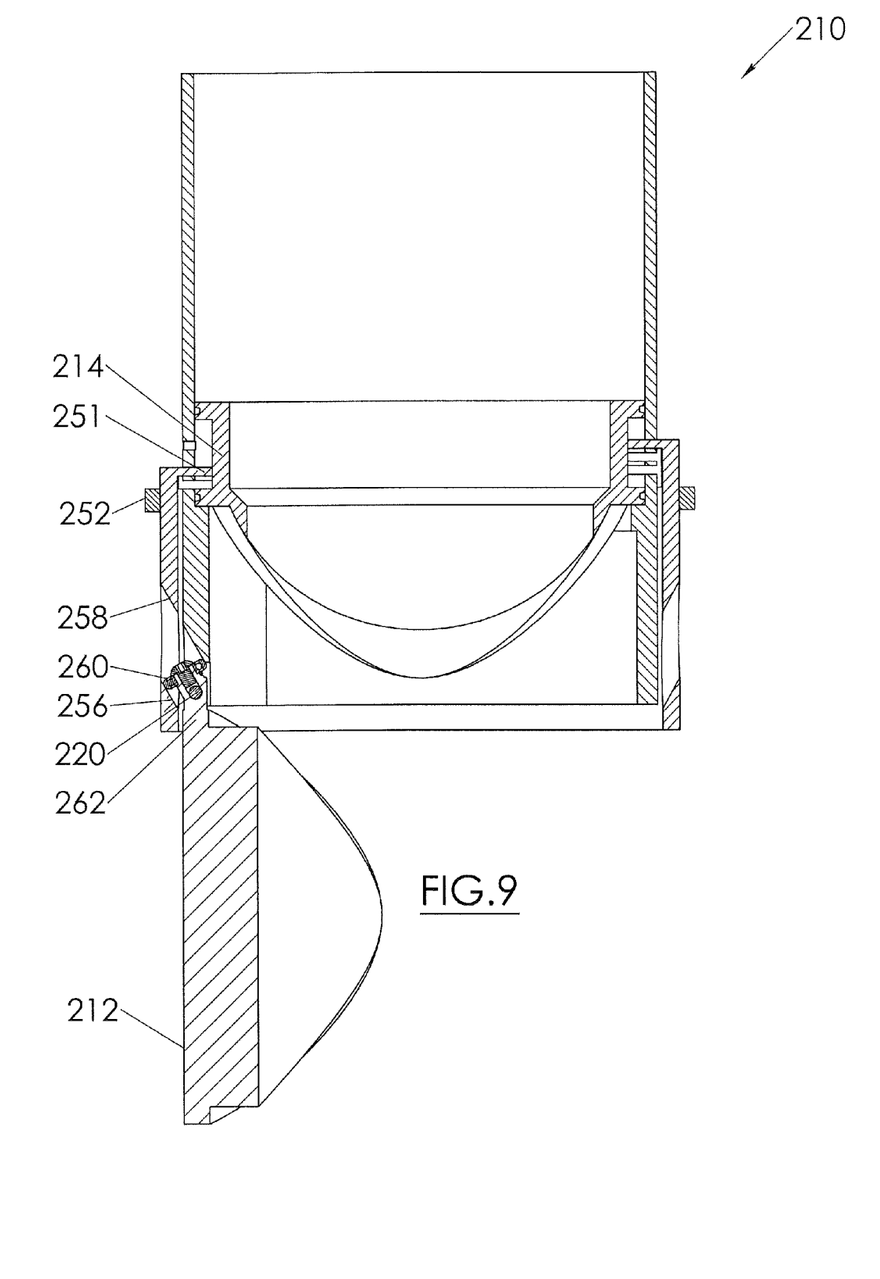
FIG. 9 is another cross sectional view of the valve of FIG. 7 in a fully open position.

Referring to FIGS. 7-9, yet another embodiment of a rotationally actuated flapper valve is illustrated. In FIG. 7, a perspective view with the valve open provides an overview of the configuration. The valve 210 includes a flapper 212 and a flapper seat 214. The flapper seat in this embodiment is distinct from those in the previously described embodiments in that it employs a ramp sleeve 250, which is rotatable to cause full open movement of the flapper 212. The flapper is still initially motivated by rotational movement of the seat 214 but in order to move the flapper to the fully open position, the sleeve is added. The sleeve 250 is also the motivator for the seat 214 as it is connected to the seat 214 through fingers 251. Sleeve 250 includes, in one embodiment, a ring gear (or at least a partial ring gear) 252 extending annularly about the sleeve 250. The ring gear 252 is employed to cause rotation of the sleeve 250 and thereby open or close the flapper 212. Any suitable drive may be employed to actuate the ring such as the drive 28 illustrated in the foregoing embodiments. In the sleeve 250 is formed an angular groove or opening 254. As illustrated, the configuration is an opening that extends completely through the sleeve 250 but it can also be configured to be a recess into the sleeve from the inside dimension surface of the sleeve 250, if desired. In any event, the groove 254 is of complex shape in one embodiment wherein the groove 254 both is helically configured relative to the sleeve axial direction and is also angled relative to that axial direction as illustrated in FIG. 9. Numerals 256 and 258 designate particular walls of the groove 254. In FIG. 9, the observer can see the angle of the walls. The angles seen in FIG. 9 are relatively steep while the angle of the same walls in an area of the walls that can be seen in FIG. 8 is substantially less steep. This is so because the walls are configured to provide a surface upon which a cam, which may be a cam roller 260 as illustrated, can bear with a load normal to the wall during movement of the flapper 212. Referring to FIG. 8, the cam roller's position relative to the flapper 212 is apparent. The cam roller 260 is supported by an extension 262 of the flapper 212 located opposite the location of the body of the flapper relative to the pivot 220. Therefore, a movement of the extension 262 in one direction will cause movement of the flapper 212 in an opposite direction. By urging the cam roller 260 to either end of the groove 254 from the central region of the groove causes the roller to climb the angled groove and urge the flapper 212 into an open position. During the movement of flapper 212 about pivot 220 (see FIGS. 8 and 9 sequentially) the cam roller 260 is moved to a significantly different orientation. The groove 254 is configured to match the motion of the cam roller by keeping the walls 256 and 258 normal to the roller 260 in order to improve efficiency of mechanical movement. Reversal of movement of the sleeve 250 will close the flapper 212 by urging the cam roller 260 back to a central location 264 of the groove 254.

Figure 10:
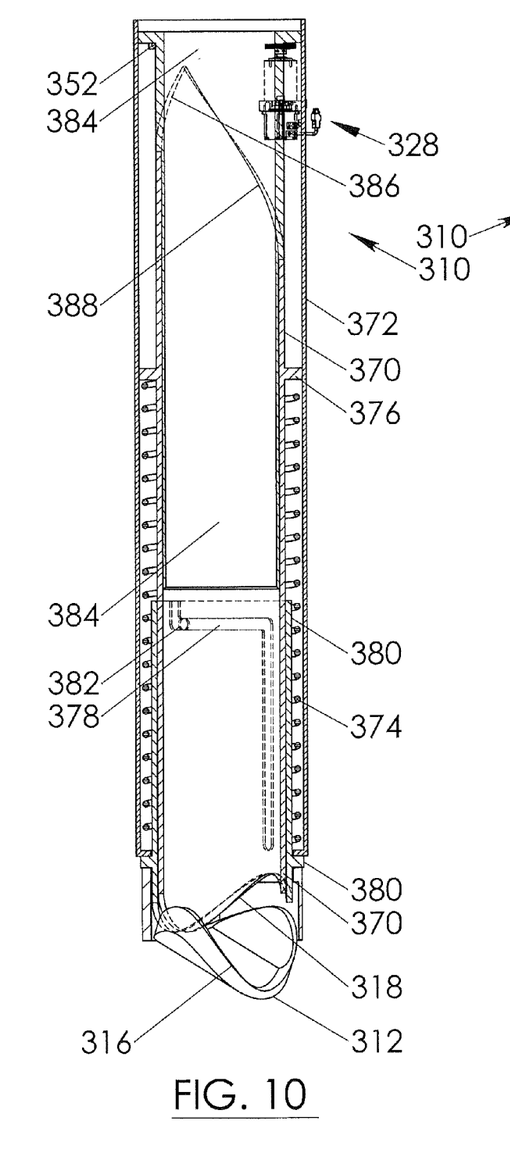
FIG. 10 is cross sectional view of another alternate embodiment of the rotationally actuated valve in a partially open position.
Figure 11:
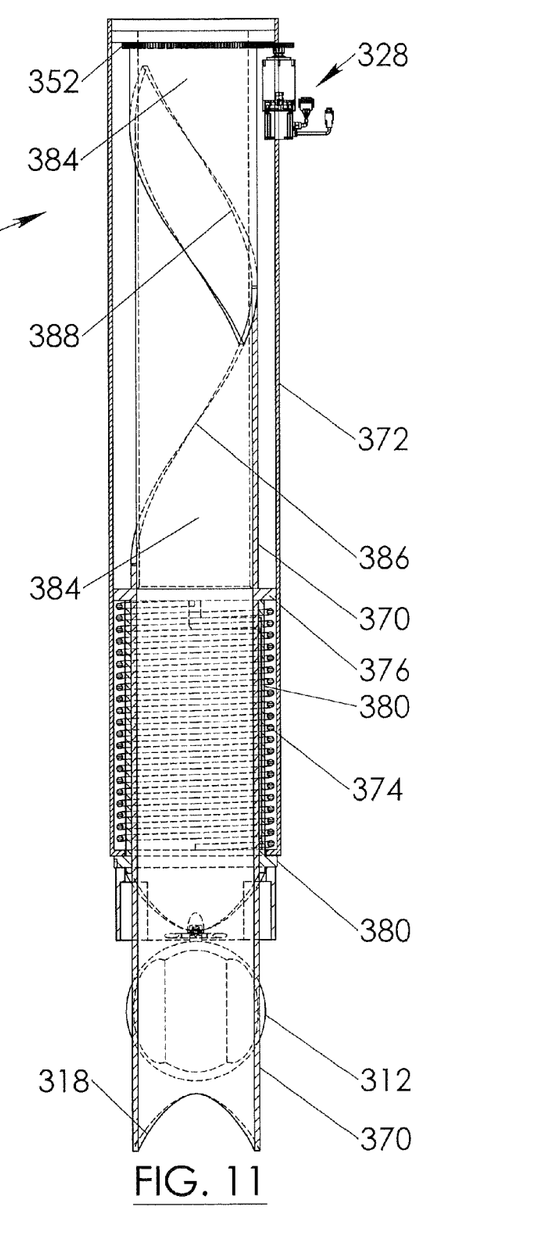
FIG. 11 is a view of a portion of the valve illustrated in FIG. 10 with components in a position where the valve is fully open.

Referring now to FIGS. 10 and 11, another alternate embodiment of the rotationally actuated flapper valve 310 is illustrated. In this embodiment, a flapper 314 is similar to those in the foregoing embodiments in that a sinuous edge 316 is included. Edge 316 mates and in some embodiments seals with a congruous (or in one embodiment complementary) edge 318, that is configured at an end of a flow tube 370, when the flapper is aligned and closed. The flow tube 370 is rotationally and axially moveable within a housing 372 and is biased to a valve closed position by a biasing member 374 such as a coil spring as illustrated. The flow tube 370 includes a biasing member attachment feature 376 such as a flange as shown. The tube 370 is constrained to rotational movement for a number of degrees of rotation when the valve is in the closed position by a groove 378 in a constraint sleeve 380. It is to be appreciated that the groove 378 is configured to extend laterally along the constraint sleeve 380 for a number of degrees and then to extend axially of the sleeve 380. This ensures that the flow tube 370 must rotate first and then extend longitudinally pursuant to rotational actuation explained further hereunder. The movement of the flow tube 370 first begins to open the flapper 312 due to misalignment of the sinuous edges 316 and 318 as is the case in the foregoing embodiments and then the flapper is openable fully by the extension of the flow tube through the seat 314 with inherent protection of the flapper behind the flow tube in the fully open position. Extension of the flow tube 370 only occurs when the constraint sleeve 380 allows that movement. This requires that a lug on the flow tube 382 that is engaged with the groove 378 has moved rotationally far enough for the lug to have moved into the axial portion of the groove 378.

Initiating the movement just described is a drive 328, which may be an electric motor, hydraulic motor, etc. as in the foregoing embodiments engaged with a gear 352. Careful reference to FIGS. 10 and 11 will reveal that the flow tube 370 is in close concentric communication with a drive tube 384. The flow tube 370 includes a helical profile 386 and the drive tube 384 includes a helical profile 388. The profiles 386 and 388 are congruous and in one embodiment complementary to one another and in any event are configured so that the rotational movement of the drive tube 384 will transfer rotational motion to the flow tube 370 and when permitted by the constraint sleeve 380 will cause axial motion. The axial motion is due to a climbing of each profile relative to the other similar to a large pitch captured nut jack screw arrangement.

In operation, and beginning from a closed flapper position, the drive 328 is actuated to impart rotational motion to the drive tube 384. Because the flow tube is constrained in axial movement due to constraint sleeve groove 378, the movement of the flow tube is solely rotational. The rotational movement misaligns the sinuous edges 316 and 318 causing the flapper 312 to partially open. When the rotational movement just described succeeds in moving the lug 382 to the axially oriented portion of the groove 378, further rotational movement of the flow tube is prevented by the constraint sleeve 380. At this point in actuation of the valve 310, the rotational movement of drive tube 384 is translated to axial movement of the flow tube 370 by the action of the profiles 386 and 388. The flow tube 370 is then axially extended through the flapper 314 a sufficient distance to fully open and protect the flapper 312. This position is illustrated in FIG. 11 where the flapper 314 in a completely open position is illustrated behind the flow tube 370 and the spring 374 is illustrated compressed. Further, an axial distance between flange 376 and gear 352 can be seen to have increased from FIG. 10 to FIG. 11. Depending upon the degree to which opening of the flapper is desired; the axial extension portion of this embodiment may or may not be employed. It is possible to simply employ the rotational portion by rotating the flow tube directly with a drive.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A rotationally actuated flapper valve comprising:
   a flapper;
   a sinuous edge perimetrically about the flapper; and
   a congruous sinuous edge disposed at another component of the valve, the congruous sinuous edge and the sinuous edge being nested with one another when the flapper is closed, the component being rotatable to misalign the congruous sinuous edge of the component with the sinuous edge of the flapper whereby at least one of the sinuous edge and the congruous sinuous edge interferes with the other of the sinuous edge and the congruous edge to directly cause opening of the flapper.

2. A rotational actuated flapper valve as claimed in claim 1 wherein the sinuous edge of the flapper is a sealing edge of the flapper in a closed position of the valve.

3. A rotational actuated flapper valve as claimed in claim 1 wherein the congruous sinuous edge is a part of a flapper seat.

4. A rotational actuated flapper valve as claimed in claim 3 wherein the seat is both rotatable and axially extendible relative to a housing of the flapper valve.

5. A rotational actuated flapper valve as claimed in claim 4 wherein extension of the seat further opens the flapper.

6. A rotational actuated flapper valve as claimed in claim 4 wherein the seat is rotated via a motor.

7. A rotational actuated flapper valve as claimed in claim 4 wherein the flapper further includes an extension extending to an opposite side of a pivot of the flapper.

8. A rotational actuated flapper valve as claimed in claim 7 wherein the extension includes a cam roller.

9. A rotational actuated flapper valve as claimed in claim 7 wherein the valve further includes a ramp sleeve.

10. A rotational actuated flapper valve as claimed in claim 9 wherein the ramp sleeve includes a groove.

11. A rotational actuated flapper valve as claimed in claim 10 wherein the groove includes walls that are angled to provide a normal intersection between the walls and the extension.

12. A rotational actuated flapper valve as claimed in claim 9 wherein the ramp sleeve is rotationally tied to a flapper seat.

13. A rotational actuated flapper valve as claimed in claim 1 wherein the valve includes two flappers each having a sinuous edge perimetrically about the flapper; and two congruous sinuous edges disposed at other components of the valve, the components being rotatable to misalign the congruous sinuous edges with the sinuous edges of the flappers whereby the flappers are urged out of a closed position.

14. A rotational actuated flapper valve as claimed in claim 1 wherein the another component of the valve is a flow tube.

15. A rotational actuated flapper valve as claimed in claim 14 wherein the valve further includes a drive tube in operable communication with the flow tube, the drive tube capable of imparting rotational and axial motion to the flow tube.

16. A rotational actuated flapper valve as claimed in claim 15 wherein the drive tube and the flow tube each include a profile configured to interact with each other.

17. A rotational actuated flapper valve as claimed in claim 14 wherein the valve further includes a constraint sleeve configured to allow rotational movement of the flow tube for a selected number of degrees of rotation while constraining axial motion of the flow tube and then to constrain rotation of the flow tube while allowing axial motion of the flow tube.

* * * * *